(12) United States Patent
Keuler et al.

(10) Patent No.: US 11,639,703 B1
(45) Date of Patent: May 2, 2023

(54) SYSTEM AND METHOD USING SECONDARY AIR PUMP FOR SECONDARY AIR INJECTION INTO TURBOCHARGED INTERNAL COMBUSTION ENGINE EXHAUST AND FOR TRANSIENTLY AUGMENTING ENGINE BOOST PRESSURE, INCLUDING MEANS FOR SUPRESSING SURGE OF THE SECONDARY AIR PUMP

(71) Applicant: Garrett Transportation I Inc., Torrance, CA (US)

(72) Inventors: Jens Keuler, Leonberg (DE); Daniel Terber, Prague (CZ); Joachim Ziegler, Stuttgart (DE)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/807,923

(22) Filed: Jun. 21, 2022

(51) Int. Cl.
*F02M 26/08* (2016.01)
*F02D 41/00* (2006.01)
*F02B 39/10* (2006.01)

(52) U.S. Cl.
CPC ......... *F02M 26/08* (2016.02); *F02D 41/0007* (2013.01); *F02B 39/10* (2013.01)

(58) Field of Classification Search
CPC .... F02M 26/08; F02M 23/00; F02D 41/0007; F02B 39/10; F01N 2550/14; F23N 2237/16
See application file for complete search history.

(56) References Cited

U.S. PATENT DOCUMENTS

| | | | | |
|---|---|---|---|---|
| 6,062,026 | A * | 5/2000 | Woollenweber | F02M 26/08 60/605.2 |
| 7,451,597 | B2 * | 11/2008 | Kojima | F02B 29/0418 60/605.1 |
| 10,648,402 | B2 * | 5/2020 | Yashiro | F02D 41/04 |
| 10,655,576 | B2 * | 5/2020 | Oh | F02M 26/65 |
| 10,844,780 | B2 * | 11/2020 | Oh | F02M 35/10255 |
| 11,220,955 | B2 * | 1/2022 | Hoecker | F02B 37/168 |
| 2018/0274436 | A1 * | 9/2018 | Kemmerling | F02B 37/162 |
| 2020/0200071 | A1 | 6/2020 | Hoecker et al. | |

FOREIGN PATENT DOCUMENTS

WO        2018083400 A1     5/2018

\* cited by examiner

*Primary Examiner* — Jesse S Bogue
(74) *Attorney, Agent, or Firm* — John C. James

(57) ABSTRACT

In a turbocharged internal combustion engine system including an eCompressor as a secondary air pump (SAP) for injecting air into an exhaust system of the ICE, controllable valves enable the turbocharger compressor and the SAP to provide two-stage compressed air to the intake of the ICE in certain operating conditions, or to feed the air via a secondary air injection line (SAI line) into the exhaust system in other conditions. A conduit is tapped off the discharge of the SAP and connects with discharge ducting from the turbocharger compressor, and an on/off valve configured for defined leakage in the "off" position controls flow through the conduit. When the air from the SAP is needed only for injection air, the leakage through the leaky valve into the intake system suppresses surge of the SAP.

12 Claims, 4 Drawing Sheets

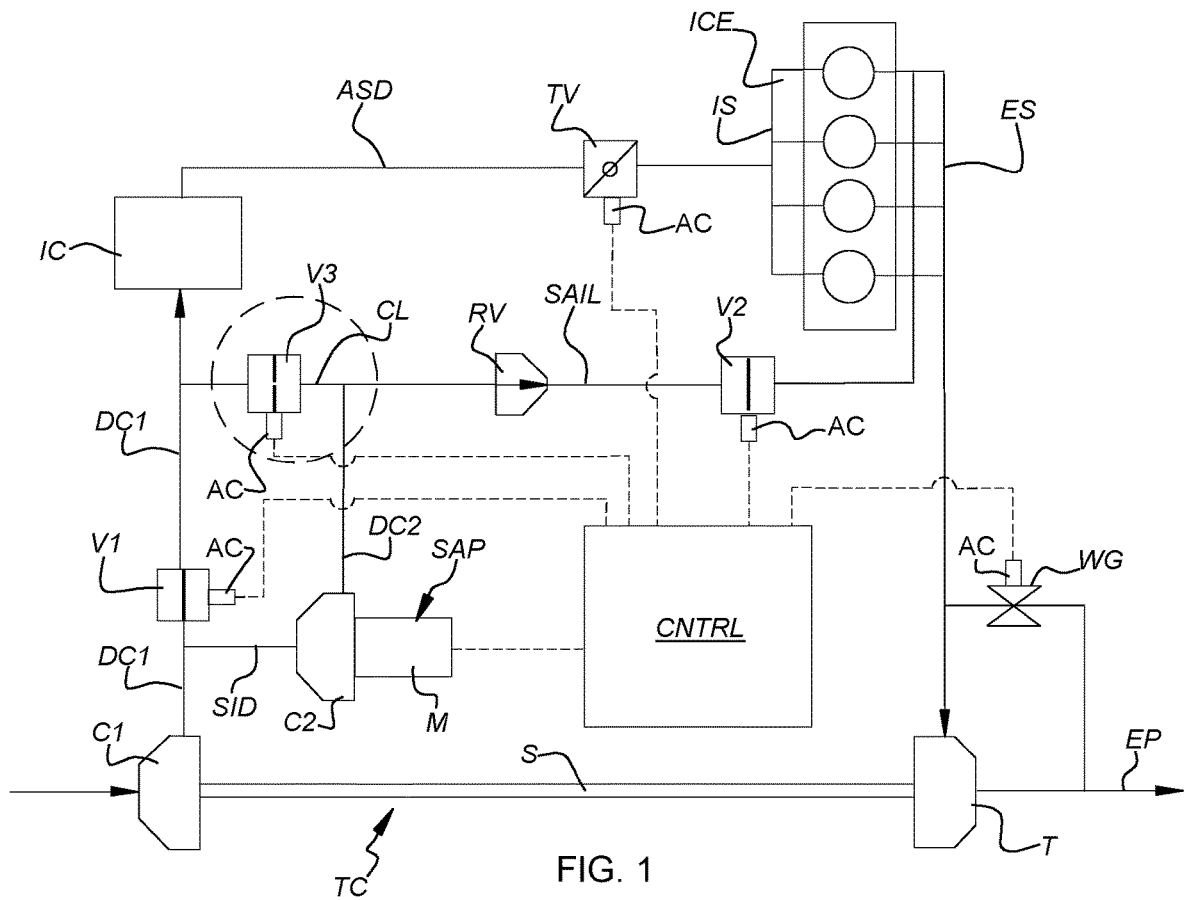
FIG. 1
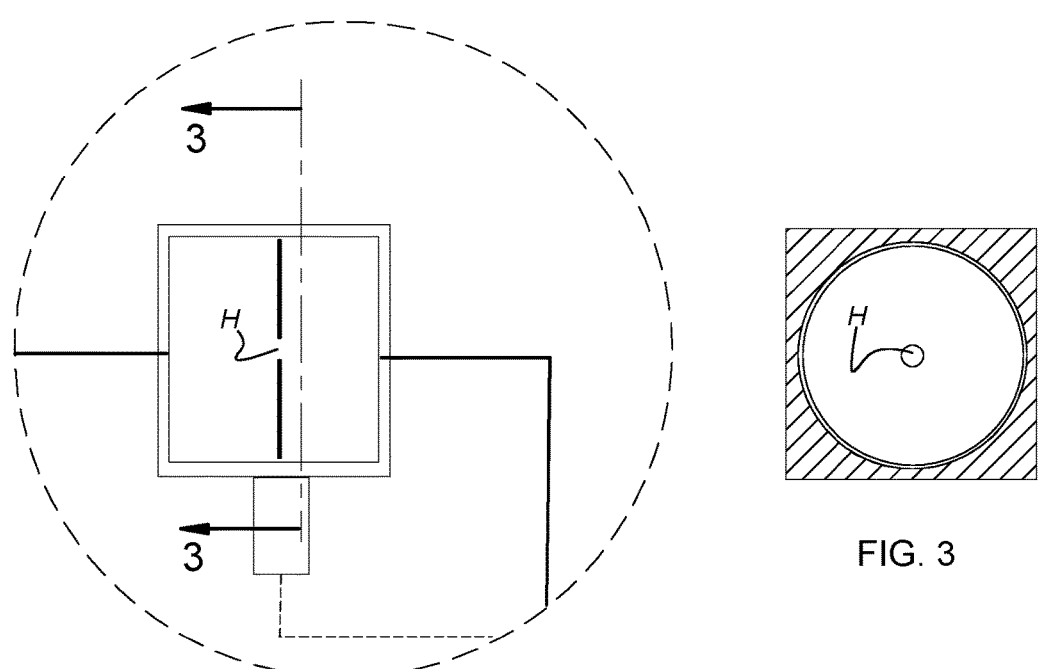
FIG. 2
FIG. 3

SYSTEM AND METHOD USING SECONDARY AIR PUMP FOR SECONDARY AIR INJECTION INTO TURBOCHARGED INTERNAL COMBUSTION ENGINE EXHAUST AND FOR TRANSIENTLY AUGMENTING ENGINE BOOST PRESSURE, INCLUDING MEANS FOR SUPRESSING SURGE OF THE SECONDARY AIR PUMP

BACKGROUND OF THE INVENTION

This application relates generally to turbocharged internal combustion engine systems, and relates more particularly to turbocharged engine systems in which a secondary air pump is employed for injecting fresh air into the exhaust stream from the engine during certain operating conditions to assist in burning or oxidation of pollutants (for example, unburned hydrocarbons) in the exhaust gases, thereby reducing emissions from the engine.

The use of secondary air injection (SM) using a secondary air pump (SAP) is a known technique for reducing engine emissions. After a cold start of the engine, the amount of unburned hydrocarbons in the exhaust gases tends to be increased, and levels of undesirable emissions out the tailpipe are relatively high until the catalytic treatment device reaches its light-off temperature. By injecting fresh air into the exhaust gases ahead of the catalytic treatment device, pollutants such as unburned hydrocarbons can be oxidized through an exothermic chemical reaction that helps heat up the catalyst more quickly. Indeed, in some cases, fuel can be intentionally injected into the exhaust gas stream ahead of the catalyst, together with secondary air injection, to induce this exothermic reaction to more-quickly heat up the catalyst.

From WO 2018/083400A1 is known a turbocharged engine system using a secondary air pump (comprising an electrically or mechanically driven compressor) connected in series with the turbocharger compressor to augment the pressure boost provided by the turbocharger compressor. At least a portion of the air compressed by the turbocharger compressor is always additionally compressed by the secondary air pump, and some portion of the two-stage compressed air is always supplied to the engine intake, while another portion is injected into the exhaust system for emissions control.

The present application describes systems and methods for using a secondary air pump to achieve the emissions control benefits noted above, and additionally to provide further benefits not typically associated with secondary air pumps.

SUMMARY OF THE DISCLOSURE

In accordance with one embodiment of the invention, a turbocharged engine system comprises an internal combustion engine (ICE) comprising an air intake system through which air is supplied to the ICE, and an exhaust system that collects exhaust gases from the ICE and exhausts said exhaust gases to atmosphere. The system includes a turbocharger comprising a compressor and a turbine, the turbine being arranged to receive exhaust gases from the exhaust system. Turbocharger air inlet ducting is coupled with the turbocharger compressor for supplying air to the compressor, and turbocharger air discharge ducting is coupled from an outlet of the turbocharger compressor to the intake system of the ICE for supplying compressed air to the ICE.

The system further comprises a secondary air pump (SAP), comprising a second compressor and an electric motor operably coupled with the second compressor for rotatably driving the second compressor. SAP inlet ducting is connected at a branch point with the turbocharger air discharge ducting from the compressor of the turbocharger, the SAP inlet ducting supplying air from the turbocharger air discharge ducting to the second compressor. An on/off valve #1 is disposed in the turbocharger air discharge ducting downstream of said branch point and is operable to shut off or allow flow therethrough. SAP discharge ducting is coupled from an outlet of the SAP to the turbocharger air discharge ducting downstream of the on/off valve #1 for supplying air compressed by the SAP into the turbocharger air discharge ducting.

A secondary air injection line (SAI line) is coupled from a connection point in the SAP air discharge ducting to the exhaust system of the ICE for injecting air thereinto, and an on/off valve #2 is disposed in the SAI line and operable to shut off or allow air injection to the exhaust system.

An on/off valve #3 is disposed in the SAP air discharge ducting downstream of said connection point of the SAI line, wherein the on/off valve #3 is movable between an open position defining an open flow area $A_o$ for a flow of air compressed by the SAP to be fed into the turbocharger air discharge ducting for supply to the ICE, and a closed position defining a closed flow area $A_c$ for said flow of air, wherein $A_c$ is equal to $k*A_o$, where $0.01 \leq k \leq 0.5$. In some embodiments, the upper limit of k can be 0.2.

BRIEF DESCRIPTION OF THE DRAWINGS

Having described the present disclosure in general terms, reference will now be made to the accompanying drawing(s), which are not necessarily drawn to scale, and wherein:

FIG. 1 is a diagrammatic illustration of a turbocharged engine system in accordance with embodiments of the invention, showing the valves of the system configured for single-stage compression of engine intake air, with no secondary air injection (SM) to the exhaust system;

FIG. 2 is a magnified portion of FIG. 1 showing the on/off valve with defined leakage in its "off" position;

FIG. 3 is a cross-sectional view through the leaky valve along line 3-3 in FIG. 2;

DETAILED DESCRIPTION OF THE DRAWINGS

Figure 4:
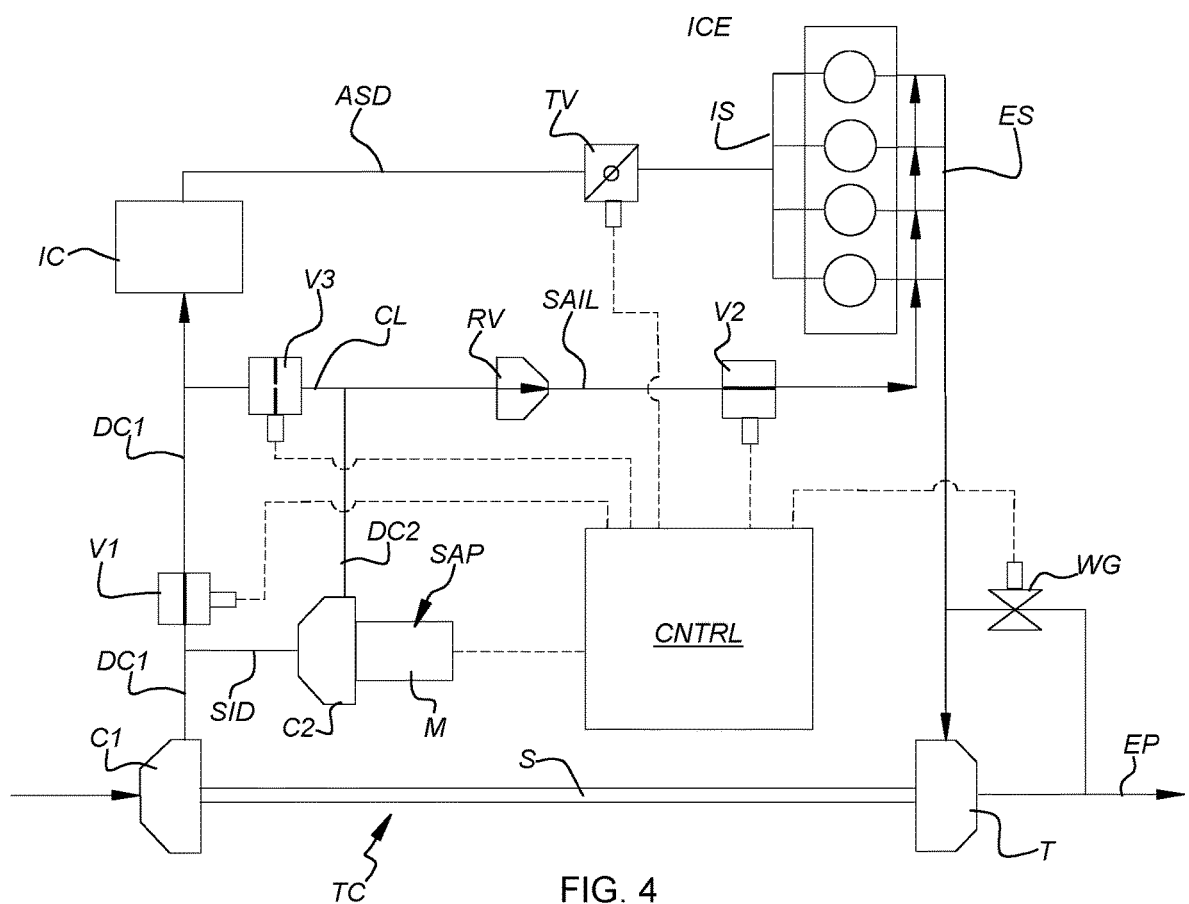
FIG. 4 is similar to FIG. 1 and shows the system with the valves configured for single-stage compression of engine intake air, with SAI to the exhaust system.

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

FIG. 1 illustrates a turbocharged engine system 10 in accordance with an embodiment of the invention. The system includes an internal combustion engine ICE having an air intake system IS through which air is supplied to the cylinders of the engine, and an exhaust system ES for exhausting the exhaust gases produced by combustion of an air/fuel mixture within the cylinders. The engine system includes a turbocharger TC comprising a compressor C1 coupled by a shaft S to a turbine T. The turbine is arranged to receive exhaust gases from the engine exhaust system ES and to expand the exhaust gases through the turbine to produce power. After passing through the turbine, the exhaust gases are discharged through an exhaust pipe EP. Typically, the turbine includes means for regulating the flow of exhaust gases to the turbine, such as a wastegate WG (or alternatively a variable nozzle for the turbine, not shown). The compressor C1 is rotatably driven by the turbine and draws ambient air in through the compressor inlet and pressurizes the air to produce primary compressed air, which is discharged from the compressor C1 through turbocharger compressor discharge ducting DC1.

The system includes a first on/off valve V1 arranged in the turbocharger compressor discharge ducting DC1. The valve V1 is operable to be opened or closed to respectively allow or prevent flow in the turbocharger compressor discharge ducting from proceeding past the valve. The system further includes a secondary air pump SAP comprising an eCompressor; that is, the SAP comprises a second compressor C2 operably coupled to an electric motor M. SAP inlet ducting SID is connected from a branch point in the turbocharger discharge ducting DC1, said branch point being upstream of the first on/off valve V1, for supplying some or all of the primary compressed air from the turbocharger compressor to the SAP. The SAP further compresses the air from the turbocharger compressor to produce secondary compressed air. The SAP includes SAP discharge ducting DC2 for discharging the secondary compressed air that has been further compressed in the SAP.

The SAP discharge ducting DC2 is connected to a secondary air injection line SAIL, which in turn is connected to the engine exhaust system ES for injecting secondary compressed air into the exhaust system in certain operating conditions. A second on/off valve V2 is disposed in the secondary air injection line and is operable to be opened or closed to respectively allow or prevent secondary compressed air from being injected into the exhaust system. The system can also include a check valve, such as a reed valve RV, in the secondary air injection line upstream of the valve V2 to prevent exhaust gases in the exhaust system from passing to the air side of the system. It should be understood that the second valve V2 can be a binary on/off valve, or can be a fully controllable valve that can be placed in intermediate partially opened positions.

The SAP discharge ducting DC2 is also connected via a connecting line CL to the turbocharger compressor discharge ducting DC1, there being an intervening third valve V3 disposed in the connecting line. The third valve can be either a binary on/off valve or a fully controllable valve. Primary compressed air being conducted in the turbocharger compressor discharge ducting DC1, together with any secondary compressed air that passes the third valve V3, is fed through an intercooler IC and is then supplied via air supply ducting ASD to the intake system IS of the ICE. A throttle valve TV is provided in the air supply ducting to regulate the supply of air to the engine.

The system includes a controller CNTRL in electrical communication with respective electrically controllable actuators AC for the various valves V1-V3, WG, and TV, as well as with the motor M for the SAP. The controller may be any means such as a device or circuitry embodied in hardware, software or a combination of hardware and software that is configured to perform the corresponding functions of the controller as described herein. In some embodiments, the controller may be configured to augment ECU capabilities with respect to turbocharger and secondary air injection operations by identifying engine conditions under which action is to be taken for injecting secondary air into the exhaust system for emissions control and/or for augmenting engine boost via combined action of the turbocharger and the SAP. As such, in an exemplary embodiment, the controller may merely provide additional functionality to the ECU. However, in some embodiments, the controller may be a separate unit from the ECU (i.e., the control unit CNTRL shown in the figures may not comprise the ECU but may be in communication with the ECU).

The controller includes a memory device. The memory device may include, for example, volatile and/or non-volatile memory. The memory device may be configured to store information, data, applications, modules, instructions, or the like for enabling the apparatus to carry out various functions in accordance with exemplary embodiments of the present invention. For example, the memory device could be configured to buffer input data for processing by the processor of the controller. Additionally or alternatively, the memory device could be configured to store instructions corresponding to an application for execution by the processor of the controller.

As noted, the processor of the controller may be a processor of the ECU or a co-processor or processor of a separate controller. The processor may be embodied in a number of different ways. For example, the processor may be embodied as a processing element, a coprocessor, a controller, or various other processing means or devices including integrated circuits such as, for example, an ASIC (application specific integrated circuit), FPGA (field programmable gate array) a hardware accelerator or the like. In an exemplary embodiment, the processor may be configured to execute instructions stored in the memory device or otherwise accessible to the processor. As such, whether configured by hardware or software methods, or by a combination thereof, the processor may represent an entity capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor, which may otherwise be a general-purpose processing element if not for the specific configuration provided by the instructions, to perform the algorithms and/or operations described herein. However, in some cases, the processor may be a processor of a specific device (e.g., the ECU) adapted for employing embodiments of the present invention by further configuration of the processor by instructions for performing the algorithms and/or operations described herein (e.g., by addition of the controller).

In whatever manner the controller is configured and implemented, it is programmed with machine-readable instructions for use by the processer to carry out the steps of the methods of the present invention. In this regard, the valves V1-V3 can be respectively controlled to place the system in a number of different configurations or modes of operation for specific purposes to be explained below.

FIG. 1 depicts the turbocharged engine system in a "standard" mode of operation in which all of the boosted air provided to the ICE is provided by the turbocharger compressor C1. The controller places the system in the standard mode by commanding the valve V1 to be open and commanding the valves V2 and V3 to be closed, and by commanding the SAP to be in an "off" or deactivated state. Accordingly, there is single-stage compression of intake air, and there is no secondary air injection into the engine exhaust system.

FIG. 4 shows the system in an air injection mode of operation in which essentially all of the boosted air provided to the ICE is provided by the turbocharger compressor, and in which secondary compressed air is injected into the engine exhaust system ES. The controller places the system in the air injection mode by commanding the valves V1 and V2 to be open and commanding the valve V3 to be closed, and by commanding the SAP to be in an "on" or activated state. In the air injection mode, a portion of the primary compressed air produced by the turbocharger compressor is bled off from the turbocharger compressor discharge ducting and is further compressed by the SAP to produce secondary compressed air, which is injected into the engine exhaust system by virtue of the valve V3 being open. At this point in the description of the systems and methods in accordance with the invention, it is necessary to consider a further aspect of the invention, namely, the desire to place the two compressors C1 and C2 in series for a two-stage compression of engine intake air in certain operating conditions. In some of those operating conditions, all of the two-stage compressed air is supplied to the engine intake, while in others, the majority is supplied to the intake and the remainder is injected into the exhaust system for emissions control. Because of these requirements, the SAP's compressor C2 must be sized large enough to accommodate all of the primary compressed air coming out of the turbocharger compressor C1. As a result, when the system is placed in the air injection mode of FIG. 4, the relatively low flow rate through the relatively large-sized compressor C2 means that the SAP's compressor C2 will tend to operate close to its surge line or even into the surge region of its map.

In accordance with the invention, the system includes means for suppressing or relieving surge of the SAP's compressor C2. More particularly with reference to FIGS. 2 and 3, the on/off valve V3 is configured to be "leaky" or in other words, the valve is configured such that in its "off" or closed position, there is a defined amount of leakage flow of air past the valve into the discharge ducting DC1. The valve is depicted in FIGS. 2 and 3 as a simple butterfly valve having a rotatable plate that is adjustable between a closed position normal to the air flow through the valve passage, and an open position oriented edge-on to the air flow. To provide a metered or predefined amount of leakage flow, a hole H (or multiple holes) can be provided through the valve plate so that in the closed position, the hole allows a small amount of leakage past the plate. The leakage flow increases the flow rate through the SAP's compressor and thereby helps to reduce the likelihood of surge.

There are many ways in which the desired amount of "leakage" flow past the valve V3 can be accomplished, besides the arrangement depicted in FIGS. 2 and 3. An another example, a leakage pipe can be connected between the discharge duct DC1 and the discharge duct DC2, downstream of the first valve V1; a non-leaky valve V3 combined with such a leakage pipe is deemed to be a "leaky valve" within the meaning of the present application. Alternatively, a third valve whose closed position does not fully seal against the valve seat, thereby allowing some leakage flow, is deemed to be a "leaky valve" as defined herein.

The amount of leakage flow required, relative to the total mass flow rate coming out of the SAP, is dependent on many factors relating to the characteristics of the engine, turbocharger, SAP, etc. In some cases, the rate of leakage flow past the third valve can constitute a majority of the total flow rate through the SAP. In some embodiments of the invention, the valve V3 in the open position defines an open flow area Ao for a flow of air compressed by the SAP, and a closed position defining a closed flow area Ac for said flow of air. Advantageously, Ac is equal to k*Ao, where $0.01 \le k \le 0.5$. More preferably, $0.02 \le k \le 0.25$, and still more preferably $0.04 \le k \le 0.2$. In the illustrative example of the valve in FIGS. 2 and 3, the closed flow area Ac is the area of the hole H, and the open flow area Ao is the area of the passage through the valve housing minus the blockage of the edgewise plate in the open position. In any case, the invention is not limited to any particular type or configuration of valve, but this illustration is provided merely for explanatory purposes. Regardless of valve type, the valve is to be configured to allow a defined leakage flow when closed.

Figure 5:
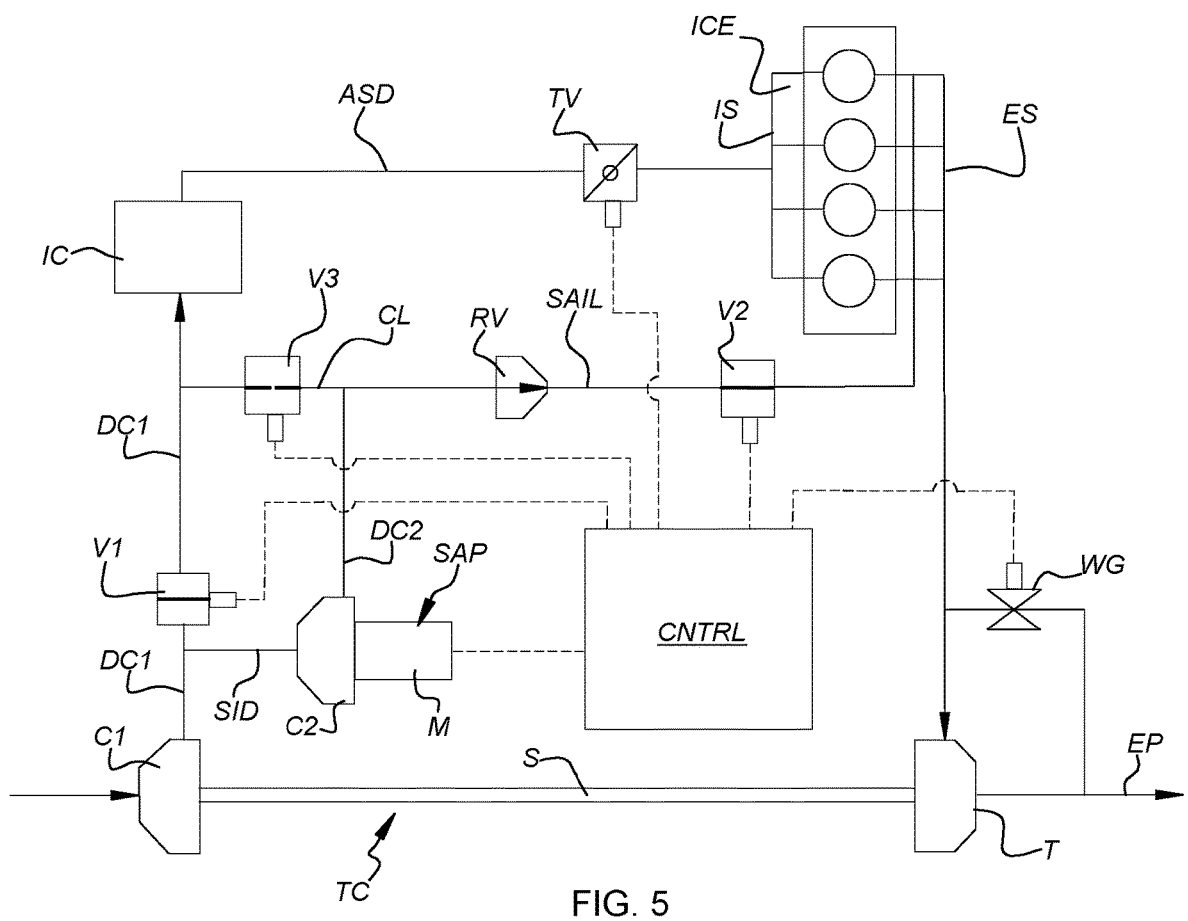
FIG. 5 shows the system with the valves configured for two-stage serial compression of engine intake air, with SAI to the exhaust system.

FIG. 5 depicts the turbocharged engine system in a first "performance" mode in which two-stage compression of engine intake air is desired, together with secondary air injection for emissions control. To place the system in the first performance mode, the controller commands valve V1 to be closed and commands valves V2 and V3 to be open, and commands the SAP to be "on" or activated. Accordingly, the SAP receives all of the primary compressed air from the turbocharger compressor and performs a second-stage compression to produce secondary compressed air. The secondary compressed air is then split between a majority portion (by mass flow) that passes through the valve V3 to be supplied to the engine intake, and a remainder (minority) portion that is injected into the engine exhaust system. The first performance mode of FIG. 5 may be employed transiently when additional engine boost is required together with secondary air injection to reduce emissions.

Figure 6:
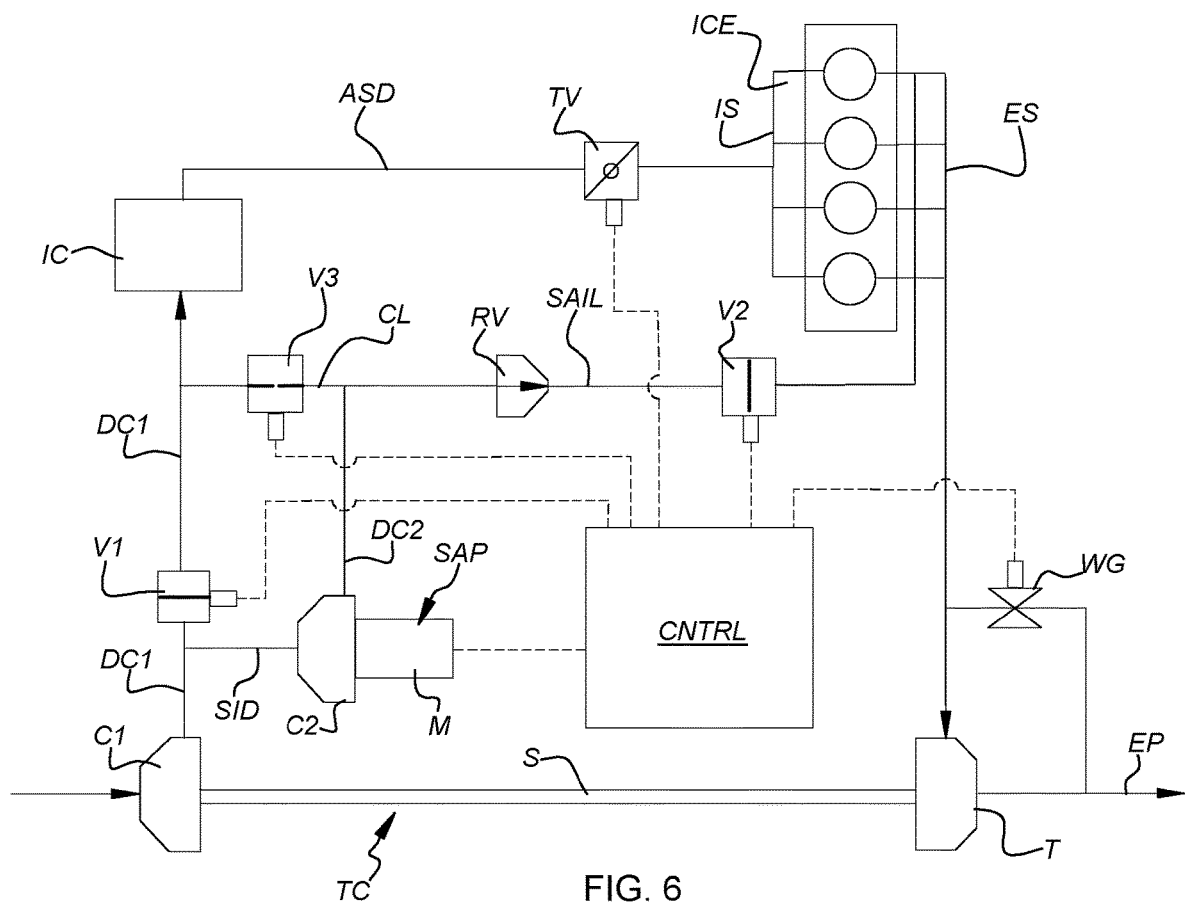
FIG. 6 shows the valves configured for two-stage serial compression of engine intake air, with no SAI to the exhaust system.

FIG. 6 shows the system in a second "performance" mode in which two-stage compression of intake air is needed but no secondary air injection is required. To place the system in the first performance mode, the controller commands valves V1 and V2 to be closed and commands valve V3 to be open, and commands the SAP to be "on" or activated. Accordingly, the SAP receives all of the primary compressed air from the turbocharger compressor and performs a second-stage compression to produce secondary compressed air. The secondary compressed air then passes through the valve V3 to be supplied to the engine intake.

As noted, the exemplary turbocharged engine system in the drawings includes means for regulating exhaust gas flow to the turbine, in the form of a wastegate WG. In other non-illustrated embodiments, the means for regulating can be a variable turbine nozzle. If desired or advantageous, the controller can control the operation of the wastegate or variable turbine nozzle for purposes of influencing the mass flow of secondary air injected into the exhaust system. During transients, the controller may keep the wastegate open for greater secondary air mass flow, or close the wastegate and thereby reduce the mass flow from the secondary air pump.

From the above description of certain exemplary embodiments of the invention, persons of ordinary skill in the art will appreciate that the invention provides distinct advantages over the state of the art. For example, the invention enables a single eCompressor to be used both as a secondary air pump for air injection into the exhaust system, and also as a second-stage compressor for enhancing the transient response of the ICE through additional engine boost. The invention also facilitates surge control for the eCompressor when it is being used for secondary air injection.

Persons skilled in the art, on the basis of the present disclosure, will recognize that modifications and other embodiments of the inventions described herein can be made without departing from the inventive concepts described herein. For example, any of the valves V1-V3 can be a fully controllable valve capable of finely regulating the flow area through the valve. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharged engine system, comprising:
    an internal combustion engine (ICE) comprising an air intake system through which air is supplied to the ICE, and an exhaust system that collects exhaust gases from the ICE and exhausts said exhaust gases to atmosphere;
    a turbocharger comprising a compressor and a turbine, the turbine being arranged to receive exhaust gases from the exhaust system;
    turbocharger air inlet ducting coupled with the compressor for supplying air to the compressor, and turbocharger air discharge ducting coupled from an outlet of the compressor to the intake system of the ICE for supplying compressed air to the ICE;
    a secondary air pump (SAP) comprising a second compressor and an electric motor operably coupled with the second compressor for rotatably driving the second compressor;
    SAP inlet ducting connected at a branch point with the turbocharger air discharge ducting from the compressor of the turbocharger, the SAP inlet ducting supplying air from the turbocharger air discharge ducting to the second compressor;
    an on/off valve #1 disposed in the turbocharger air discharge ducting downstream of said branch point and operable to shut off or allow flow therethrough;
    SAP discharge ducting coupled from an outlet of the SAP to the turbocharger air discharge ducting downstream of the on/off valve #1 for supplying air compressed by the SAP into the turbocharger air discharge ducting;
    a secondary air injection line (SAI line) coupled from a connection point in the SAP air discharge ducting to the exhaust system of the ICE for injecting air thereinto;
    an on/off valve #2 disposed in the SAI line and operable to shut off or allow air injection to the exhaust system; and
    an on/off valve #3 disposed in the SAP air discharge ducting downstream of said connection point of the SAI line, wherein the on/off valve #3 is movable between an open position defining an open flow area $A_o$ for a flow of air compressed by the SAP to be fed into the turbocharger air discharge ducting for supply to the ICE, and a closed position defining a closed flow area $A_c$ for said flow of air, wherein $A_c$ is equal to $k*A_o$, where $0.01 \le k \le 0.5$.

2. The turbocharged engine system of claim 1, wherein the SAP, the on/off valve #1, the on/off valve #2, and the on/off valve #3 are each electrically actuatable and controllable via control signals, and further comprising a controller in electrical communication with the SAP and with each of the on/off valve #1, the on/off valve #2, and the on/off valve #3 for providing control signals thereto.

3. The turbocharged engine system of claim 2, wherein the controller is programmed with machine-readable instructions for performing the steps of:
    A) operating the engine system in a standard mode by deactivating the SAP and by opening the on/off valve #1 and closing the on/off valve #2 and the on/off valve #3, the standard mode being characterized by the intake of the ICE being supplied with compressed air by the turbocharger compressor alone and by absence of SAI; and
    B) operating the engine system in a secondary air injection mode by activating the SAP and by opening the on/off valve #1 and the on/off valve #2 and closing the on/off valve #3, the secondary air injection mode being characterized by the ICE being supplied with compressed air by the turbocharger compressor alone and by the SAP injecting compressed air into the exhaust system of the ICE, and by a delimited leakage of air through the on/off valve #3 to provide surge relief to the SAP.

4. The turbocharged engine system of claim 3, wherein the controller is programmed with machine-readable instructions for performing the further step of:
    C) operating the engine system in a first performance mode by activating the SAP, closing the on/off valve #1 and the on/off valve #2 and opening the on/off valve #3, the first performance mode being characterized by the turbocharger compressor and the SAP performing two-stage serial compression of air which is supplied to the intake of the ICE and by absence of SAI.

5. The turbocharged engine system of claim 3, wherein the controller is programmed with machine-readable instructions for performing the further step of:
    D) operating the engine in a second performance mode by activating the SAP, by closing the on/off valve #1, and by opening the on/off valve #2 and the on/off valve #3, the second performance mode being characterized by the turbocharger compressor and the SAP performing two-stage serial compression of air, a portion of which is supplied to the intake of the ICE and the remainder of which is injected into the exhaust system of the ICE.

6. The turbocharged engine system of claim 5, further comprising means for regulating exhaust gas flow to the turbine, said means for regulating exhaust gas flow being electrically controllable by control signals, and wherein while operating in the second performance mode, the controller controls said means for regulating exhaust gas flow so as to affect the mass flow rate of the compressed air injected into the exhaust system of the ICE.

7. The turbocharger engine system of claim 6, wherein said means for regulating exhaust gas flow is a waste gate.

8. The turbocharger engine system of claim 6, wherein said means for regulating exhaust gas flow is a variable nozzle of the turbine.

9. A method for operating a turbocharged engine system including an internal combustion engine (ICE) and a turbocharger comprising a turbine receiving exhaust gases from the ICE via an exhaust system, and a compressor rotatably driven by the turbine to compress air for supply to an intake of the ICE, and further including a secondary air pump (SAP) comprising an eCompressor, the method comprising the steps of:

during operating conditions requiring enhanced control of emissions from the exhaust system, (a) operating the turbocharger compressor to produce primary compressed air for supply to the intake of the ICE, (b) bleeding off a bleed portion of the primary compressed air and diverting said bleed portion through the SAP, the SAP further compressing said bleed portion to produce secondary compressed air, (c) injecting a majority of the secondary compressed air by mass flow into the exhaust system of the ICE, and (d) supplying a remainder of the secondary compressed air to the intake of the ICE.

10. The method of claim 9, further comprising the steps of:

during operating conditions requiring enhanced control of emissions from the exhaust system and also requiring additional engine boost, (e) operating the turbocharger compressor to produce primary compressed air, (f) feeding the primary compressed air to the SAP, the SAP further compressing said primary compressed air to produce secondary compressed air, (g) supplying a majority of the secondary compressed air by mass flow to the intake of the ICE, and (h) injecting a remainder of the secondary compressed air into the exhaust system of the ICE.

11. The method of claim 9, further comprising the steps of:

during operating conditions not requiring enhanced control of emissions but requiring additional engine boost, (j) operating the turbocharger compressor to produce primary compressed air, (k) feeding the primary compressed air to the SAP, the SAP further compressing said primary compressed air to produce secondary compressed air, and (l) supplying all of the secondary compressed air to the intake of the ICE.

12. The method of claim 9, further comprising the steps of:

during operating conditions requiring neither enhanced control of emissions nor additional engine boost, (m) operating the turbocharger compressor to produce primary compressed air, (n) deactivating the SAP, and (o) supplying all of the primary compressed air to the intake of the ICE.

\* \* \* \* \*